United States Patent [19]

McGlew

[11] Patent Number: 5,772,213
[45] Date of Patent: *Jun. 30, 1998

[54] GAME BASED ON DATA BASE OF CHARACTERS OF DIFFERENT GEOGRAPHIC REGIONS

[76] Inventor: John James McGlew, 653 Scarborough Rd., Briarcliff Manor, N.Y. 10510

[*] Notice: The term of this patent shall not extend beyond the expiration date of Pat. No. 5,618,043.

[21] Appl. No.: 787,869

[22] Filed: Jan. 23, 1997

Related U.S. Application Data

[63] Continuation-in-part of Ser. No. 478,613, Jun. 7, 1995, Pat. No. 5,618,043.

[51] Int. Cl.[6] .......................................................... A63F 1/00
[52] U.S. Cl. .................................. 273/308; 403/1; 403/9
[58] Field of Search .............................. 463/1, 9, 10, 22; 273/236, 279, 292, 161, 308; 434/128, 129, 147, 130, 322; 364/410

[56] References Cited

U.S. PATENT DOCUMENTS

| | | | |
|---|---|---|---|
| 4,193,213 | 3/1980 | Suda | 273/161 |
| 4,304,554 | 12/1981 | Slayden | 273/161 |
| 4,882,473 | 11/1989 | Bergeron et al. | 463/25 |
| 5,205,563 | 4/1993 | Dearing | 434/130 |
| 5,466,159 | 11/1995 | Cleark et al. | 434/322 |
| 5,618,043 | 4/1997 | McGlew | 463/9 |

FOREIGN PATENT DOCUMENTS

| | | | |
|---|---|---|---|
| 2216020 | 10/1989 | United Kingdom | 273/292 |

OTHER PUBLICATIONS

Dungeon Masters Guide (copyright 1979 —TSR GAmes, p. 13) by Gary Gygax, Dec. 1979.

*Primary Examiner*—Jessica Harrison
*Assistant Examiner*—James Schaaf
*Attorney, Agent, or Firm*—McGlew and Tuttle

[57] ABSTRACT

A game wherein characters are defined to form a data pool. Each character in the data pool is related to and distinguished from the other characters in the data pool by a geographic location data. The data preferably includes actual information such as geographic information, city, country(the character is present in), maps, house plans etc. However, the data can also be fictitious, such as imaginary worlds with imaginary cites towns etc. The character data may be presented to the player for review or interaction to further develop the character. The characters may be randomly selected from the data pool to simulate the possibility/probability of living at the locations corresponding to the data. Several characters may be provided in sequence, each with a potentially different date and location data.

16 Claims, 9 Drawing Sheets

GAME BASED ON DATA BASE OF CHARACTERS OF DIFFERENT GEOGRAPHIC REGIONS

CROSS REFERENCE TO RELATED APPLICATION

This is a continuation-in-part application of application Ser. No. 08/478,613 filed Jun. 7, 1995, now U.S. Pat. No. 5,618,043.

FIELD OF THE INVENTION

The present invention relates to the field games in general and more particularly to a game based on data, preferably historical data wherein a game character is generated based on a statistical probability of a person being born in a certain place for a given time.

BACKGROUND OF THE INVENTION

Games are well known which present similarities to real life. A board game "the game of Life" presents the players with a series of options and random events (such as by movement over event spots or by the drawing of cards) wherein a player can move a game character, make decisions and have one of a plurality of events occur. The character which attains the most points toward the goal (making the most money) wins the game.

Other games are known which develop characters or multiple characters, controlled by a player, based on historical events. Some games have provided the information and data to recreate or create a new situation based on historical data. Examples include board games which recreate historic battles or situations. Computer (video) games exist such as Secret Weapons of the Luftwaffa, wherein data from the 1940's air campaign area of Europe during World War II is used to provide a player with the opportunity to interact with the situational settings based on the data.

Other games exist wherein the player is provided with the opportunity to act based on a situation of power. Computer (video) games exist wherein the player is made the President of the United States and is provided with the opportunity during the game to take actions as if the player is the president.

CD Rom and other high data games have become available for computers. This presents the possibility of much more data being available to a player. These games have included fantasy games wherein the player can wonder through a haunted house or a mysterious place and interact with the place based on the extensive data stored on the compact disk.

SUMMARY AND OBJECTS OF THE INVENTION

It is an object of the invention to provide a game wherein characters are defined to form a data pool. Each character in the data pool is related to and distinguished from the other characters in the data pool by a geographic location data.

The data preferably includes actual information such as geographic information, city, country(the character is present in), maps, house plans etc.. However, the data can also be fictitious, such as imaginary worlds with imaginary cites towns etc.

Historical data is preferably used to balance the number of characters in the pool in a geographic area and the actual human population for the area. The characters preferably are associated with a time period. The time period data may be general (1880–1850) or be the period of time from the birth of the character until the death.

Character identity data is based on statistical probabilities for birth of a human at a location period or time in the past or future. The data is preferably representative of real data, for the world, over time (for time periods or for example 30,000 BC and forward.

It is a further object of the invention to provide a player with the opportunity to experience game character identity data (audio, video computer graphics, text, interacting scenario algorithms et.) wherein the character identity includes information such as position on the planet earth of the character at a time (time period, date of birth, birth/death date , etc.). Other identity information may be included in the data pool such as, environment, culture, race, economic status and government situation.

It is a further object of the invention to simulate the various possibilities and probabilities of randomly becoming some person of the past, present and future. The possibilities preferably provide geographic data and other characteristics particular to characters, the characters comprising one or more data pools. Other character independent data could also be provided. Data such as intelligence and possibilities of being affected by natural disaster, etc could be accessed independently to present a game player with a character and other data from a large number of possibilities.

It is further an object of the invention to provide a game with selection means for selecting from character pools and other data pools to present character data to a player and allow a selection of one or a series of characters. The characters are selectable by various data categories including geographic location, time, and others. Further, the series of characters may be provided in a pattern as if reincarnated or each character of a series of characters may be in one of several time periods, thus allowing the player to proceed through history and be acquainted with information about various places. The series of characters may be in the same time, the player experiences the period over and over again.

It is still another object of the invention to formulate a game wherein a player can choose a date in history and be provided with character identity information wherein the character identity information includes geographic place of birth and this corresponds substantially (some estimation is necessary)with the probabilities and possibilities of a person being born in a certain place at that particular time in history.

According to a preferred form of the invention, real data as to the number of humans born or alive during history can be considered to formulate a game wherein characters are provided from stored data including location of the character which is representative of the actual distribution of births over the planet around that time. Here, the player will have a much higher probability of receiving a character born in China than for example the country Canada. At the time 100 AD, the player will have a much higher probability of being born in Africa, Europe or Asia as compared to the probability of birth in North and South America.

According to the invention, a game is provided including identification generating means for generating a character identity based on identity data including location of the character data.

The game according to the invention is preferably played using a format wherein large amounts of data can be accessed. It can be based on a compact disk or similar computer readable media holding data (data via wire or wireless is also acceptable).

A further aspect of the game includes the provision of a display of the provided character or series of characters. This may be by cards, for a board game or by computer audio/video, for the computer version of the game.

With the CD Rom computer version in the simplest form, detailed information can be provided as to the location including information as to the maps of cities, information as to the overall population of the location or country of location at time of birth and other information relating to both geography, history and social studies in general. The data may be presented on various screen windows with soft buttons for control and the data may include audio and video. The soft keys may be used to interact with trees of data allow interaction and selection of options by the game player. By the selection of options which lead to different data paths, the player can help develop the character.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS In the drawings.

DETAILED DESCRIPTION OF THE PREFERRED EMBODIMENTS

Referring to the drawings in particular, the invention comprises a game which includes a data base of characters. Each character in the database has a character identity data. The character identity data, which forms the data base, includes some characteristic relating to a time or time period and a geographic location. The characteristic can be the location of the character at birth and the date of birth. The characteristic can also be the time period the character lives and the geographic region (or regions) the character lives in. The data for the location of the character is preferably based or somewhat representative of actual data for the period.

Analogy to Historical Data

Figure 1:
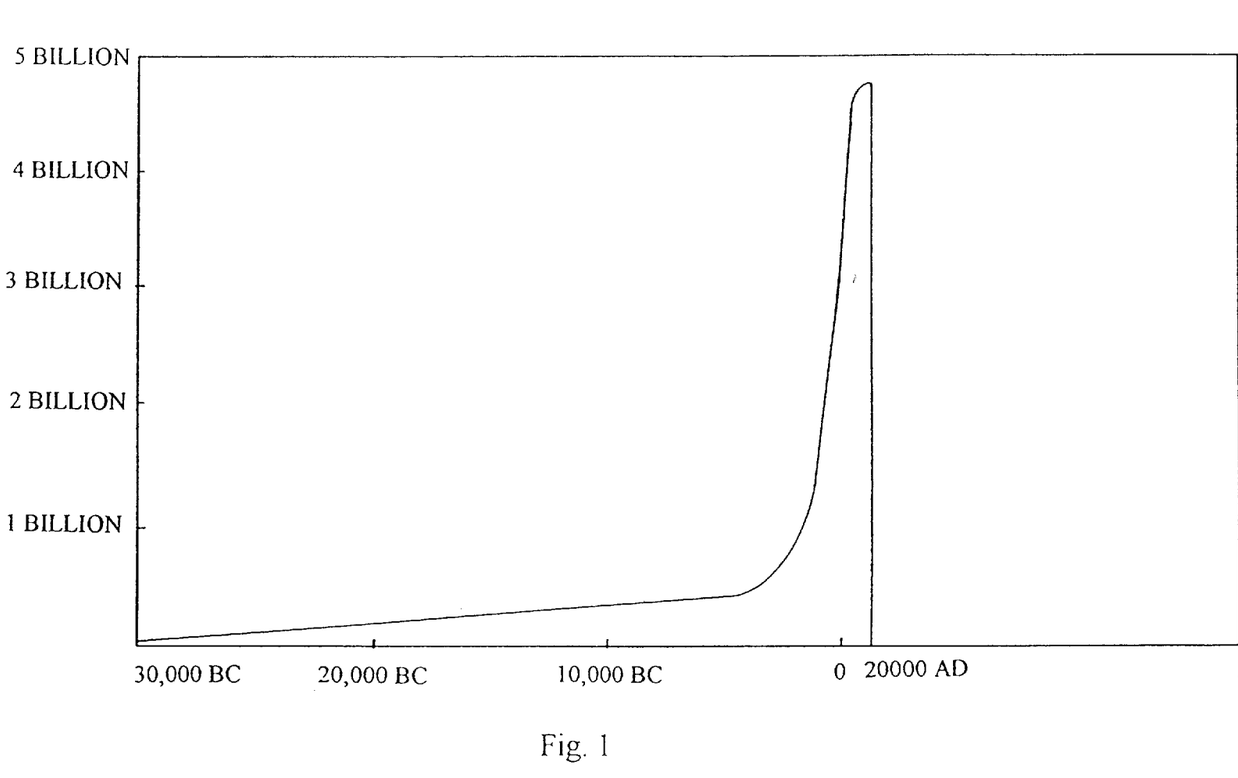
FIG. 1 is an example of data that could represent the number of humans alive on the planet earth (ordinate) in relationship to time (abscissa)

FIG. 1 shows a graph which is an approximation of human population over time. The graph is not accurate and only illustrates the use of real data (historical data, reasonable approximations, expert estimates) for forming the data base of characters according to the invention.

If it assumed that FIG. 1 is illustrative of the human population of the earth over time, the invention provides a character pool comprised of a plurality of characters, each character with a character identity. The character identity characteristic which is particular to a defined character identity generally relates to the other characteristics of the characters in the data base pool in a manner which is analogous to the relationship of an individual born on the planet Earth to the entire pool of human individuals born on the planet Earth.

The invention requires at least one character pool such as a character pool with character geographic locations based on all humans born on the planet Earth. A characteristic to distinguish between the various characters may be for example the time period a character is alive and the geographic region the character lives at.

Single Character Pool

Figure 2:
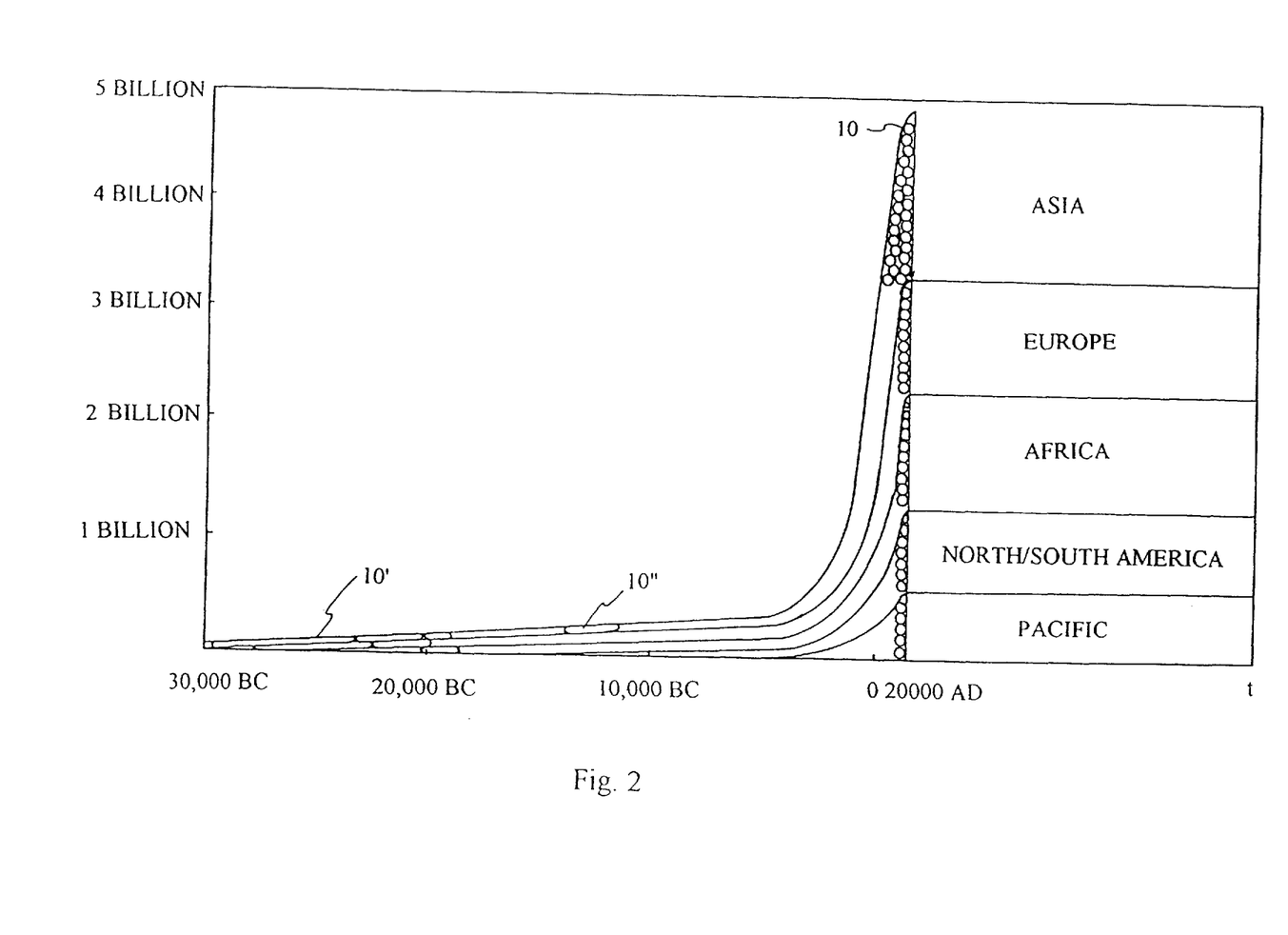
FIG. 2 is a graph similar to FIG. 1 illustrating the definition of characters based on location and time.

According to the embodiment of FIG. 3a–3d, 1,000 character identities are defined based on 1,000 playing cards. Assuming that the population graph of FIG. 1 represents approximately 10 billion humans who have inhabited planet Earth, each of the 1,000 cards roughly represents 10 million people. As the area under the curve of FIG. 1 is generally representative of all humans which inhabited the planet Earth, the area under the curve may be divided into 1000 smaller areas. The 1000 areas (only some are represented in FIG. 2) each represent humans in a general time period. The geographic location is used to distinguish between characters as shown in FIG. 2.

Geographic location of the character is provided according to the various embodiments of the game. As can be seen in FIG. 2, the populations of the various regions of the world (Asia; Europe; Africa; N/S America; Pacific)are depicted (estimated). For character identities in the twentieth century, all of the geographic locations will be represented. That is, character identities which are representative of actual population will result in a higher proportion of the cards having characters with lives in the twentieth century and very few characters in prehistoric times.

The analogy to historic data depends on the accuracy of the historic data. The number of characters also affects the analogy to history. However, one thousand characters provides enough for characters ranging over a large time span and spread over the earth. The use of approximations as to population over a wide time period (5000 BC–1000 BC) is also contemplated according to the invention.

Figure 3A:
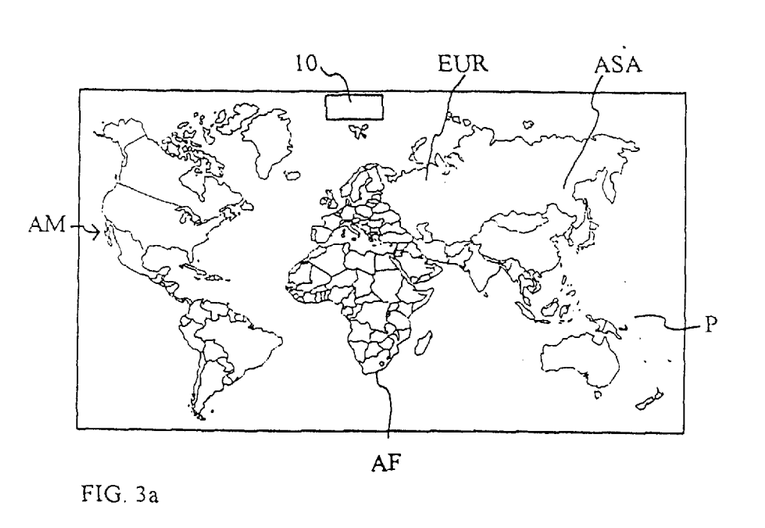
FIG. 3a is a top view of a board game embodiment of the game according to the present invention.

FIG. 3a shows a game board 6 with a plurality of cards 10. The board depicts the world and may also show regions of the world grouped together. For example the grouping could be 1)Asia;2)Europe;3)Africa; 4)North America/South America and 5)Pacific (Australia, New Guinea, Philippines, Polynesia etc). Cards 10 are provided for play.

Figure 3B:
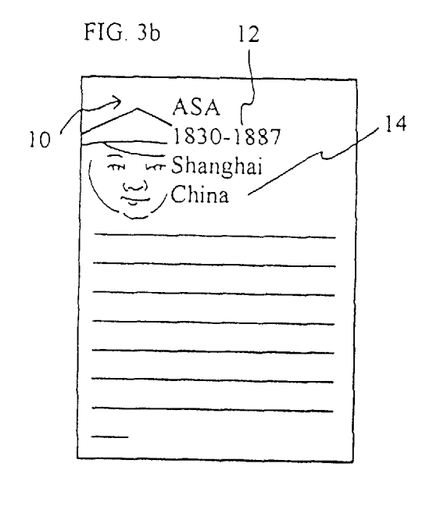
FIG. 3b is a view of an example of a character card, according to the game of the invention.

FIG. 3b shows a card 10 which depicts a character and provides some date or time period 12. A geographic location 14 is indicated. Each card 10 represents a population group of roughly 10 million. The cards are defined in a manner which represents the population over time and by geographic region. Of the 1,000 cards (1,000 character identities according to the embodiment of FIG. 3), there are roughly for example 150 cards of characters with an Asian geographic location and a life period of roughly between 1900 and the year 2000. This generally corresponds to 1.5 billion people. Precise geographic locations can be provided or geographic regions wherein the individual spends its life. For example of the 150 cards relating to Asia, the characters may be dispersed at various locations including Beijing, Shanghai, Tokyo, Southeast Asia, etc. Preferably, the distribution should correspond generally to the actual population distribution for that time period.

The character identity information is provided on cards 10. An example of such a card is shown in FIG. 3b. The critical character identification information is displayed. According to the embodiment of FIG. 3a, the critical information includes the time period in which the character lives and the geographic region which the character lives in. The time period could include just a date of birth but according to the example of FIG. 3b, a time period 12 is provided ("from 1830–1887"). The geographic information may be general such as China or maybe more specific such as information 14 "Shanghai, China".

Figure 3C:
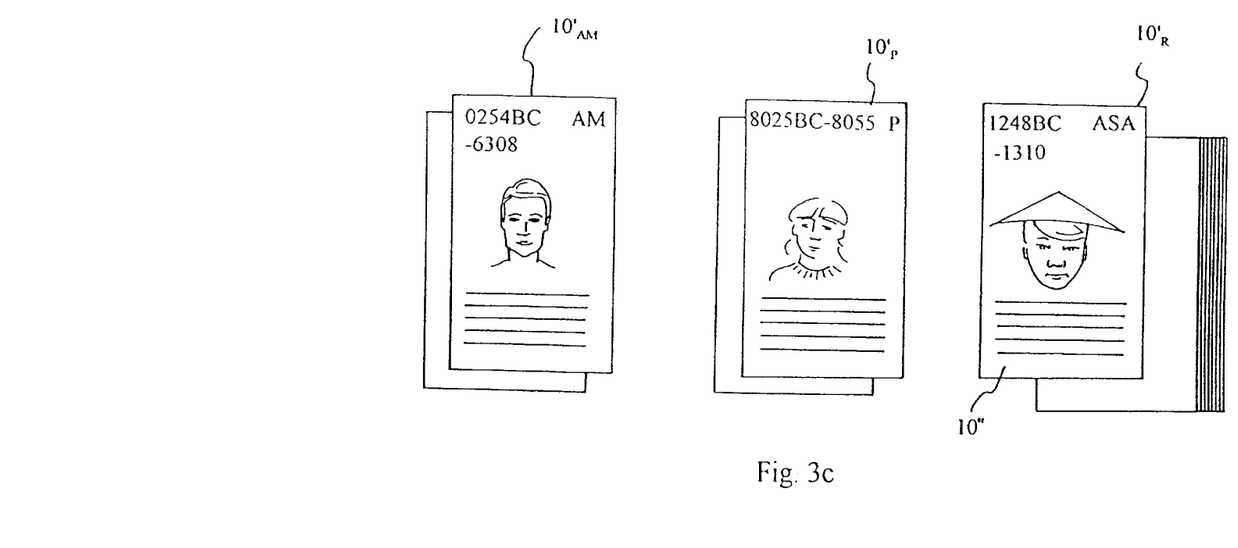
FIG. 3c is a view of several cards according to the game of the invention.

For cards representing population in recent times, the entire population group of 10 million may fall clearly within one of the geographic regions. However, in prehistoric and earlier times, the actual population of humans in various geographic locations is much below the 10 million population group which each card generally represents. For this reason, the cards will be distributed less accurately and will not be representative of actual population distributions in a geographic sense. For example, several of the first 100 cards 10' of the embodiment of FIG. 3a are shown in FIG. 3c. These include two character cards from South and North America $10_{Am}$', two characters from the pacific region $10_p$' with the remainder of the characters being from Asia, Europe and Africa $10_R$. Here, the distribution is generally representative of the population (see FIG. 2). FIG. 3c shows a card 10", the 24th card. The character is a person who lives in Asia. As can be seen in FIG. 2, the card 10" represents a population over many hundreds of years although the character has a character identity with a birth date and death date (time characteristic 12) which only generally correspond to the population the character represents.

Besides the character information as to geographic location and period of time, other information can be provided including general historical information such as culture including dress of the character, practices in the character's region during the character's time period and for example occupation and family relationships.

Figure 3D:
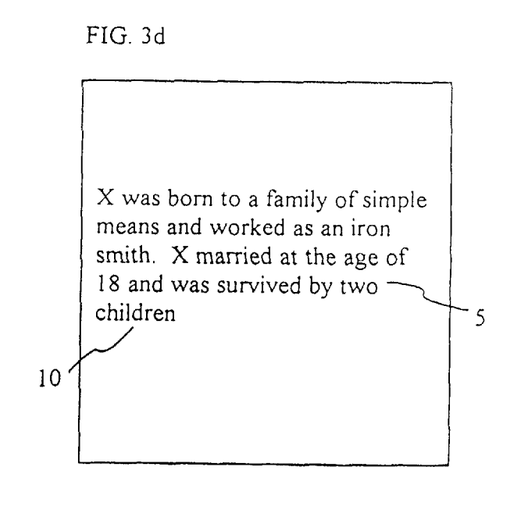
FIG. 3d is a cutaway view of another card.

FIG. 3d shows a card with a time period 12 (100 AD to 145 AD), a geographical location (Europe, Italy, Rome) can be provided and a historical story (S) such as "X was born to a family of simple means and worked as a iron smith. X married at the age of 18 and was survived by two children."

Various goals can be provided for the game according to FIG. 3a based on the information provided. According to a first version of the game, the players select the cards in turn and match the card against the map provided on the game board 6. Geographic regions of the planet are grouped to define five geographic locations. These are Asia (Asa), Europe (Eur), Africa (Af), South and North America (Am) and Pacific (P). According to this embodiment, only 20 of the cards are from Australia/Polynesia/Burma/Philippines/New Guinea and the 20 cards do not have to precisely represent 200 million people). The players receive the cards and group the cards by geographic location and the winner is the first individual to complete each geographic location, namely take at least one card with a character identity for each of the five geographic locations.

The preferred scheme of defining locations for the cards is based on separating the populations as shown in FIG. 1 wherein the population is shown over time. Starting from left to right in FIG. 2, cards are assigned for each geographic location, upon that geographic location attaining a population of 10 million people. Based on non-exact numbers, and an obvious need to generalize and approximate in prehistorical and early historic times, the first card (the first population group to reach 10 million) is African, and followed by the second card being Asian, successive cards might be African and Asian or European, etc. until all cards have a character identity, generally representative of a 10 million person actual population group. The time period of the character for the card may be randomly chosen within the time period of the population group. However, preferably, the character identification for a given card has a time period which is approximately in between the overall time period of the population group. For purposes of the game, some flexibility is provided for defining characters. For example, according to this embodiment, although there may or may not have been 200 million people who lived in the Australia Polynesia Burma, Philippines etc. region (Pacific region)but nevertheless 20 cards are provided. Further, for convenience, the cards may be distributed as follows Burma 8, Australia 2, New Guinea 1, Philippines 5, Polynesia 3 and Micronesia 2. By making the time period of the character based on the average of all individuals born in the population group, the New Guinea born character is born after 1 AD and preferably in the 20th century.

Multiple Character Pools

Figure 4A:
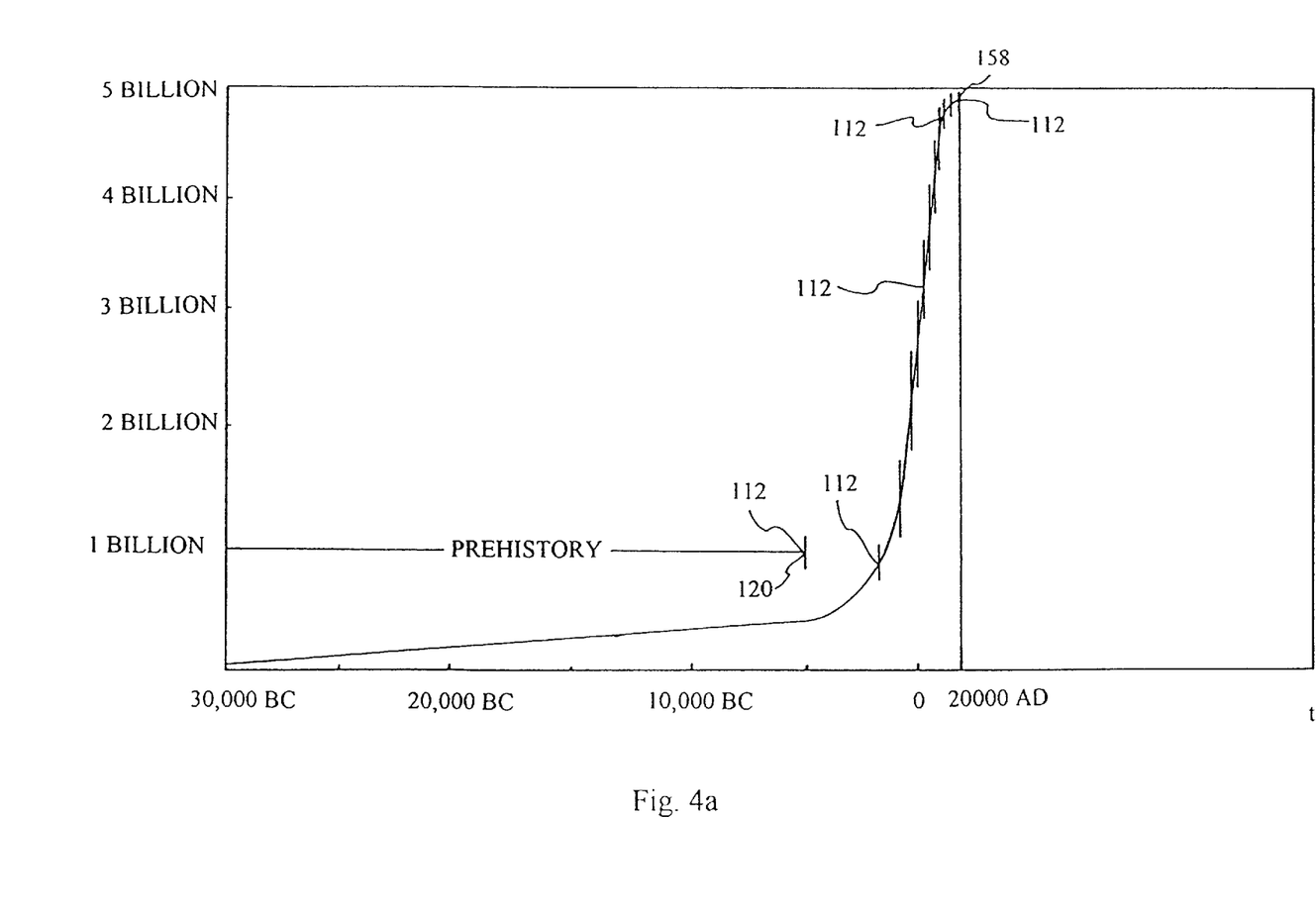
FIG. 4a is a graph similar to FIG. 1, showing grouping of characters by date and defining multiple data pools.
Figure 4B:
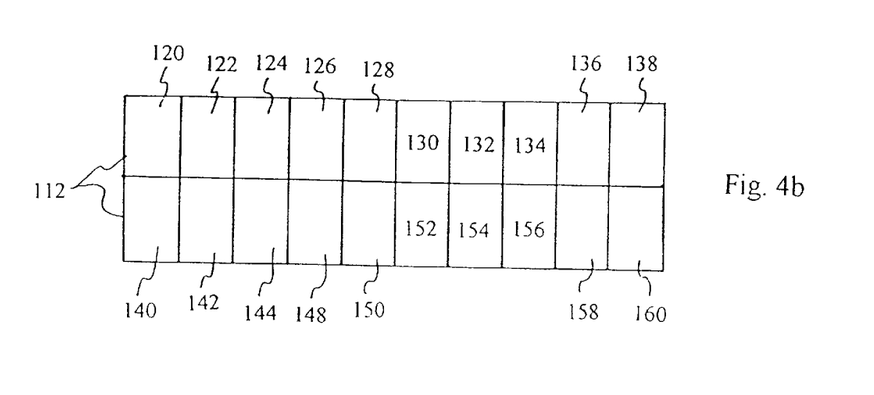
FIG. 4b is a diagram illustrating grouping of characters by date to define multiple data pools.
Figure 5:
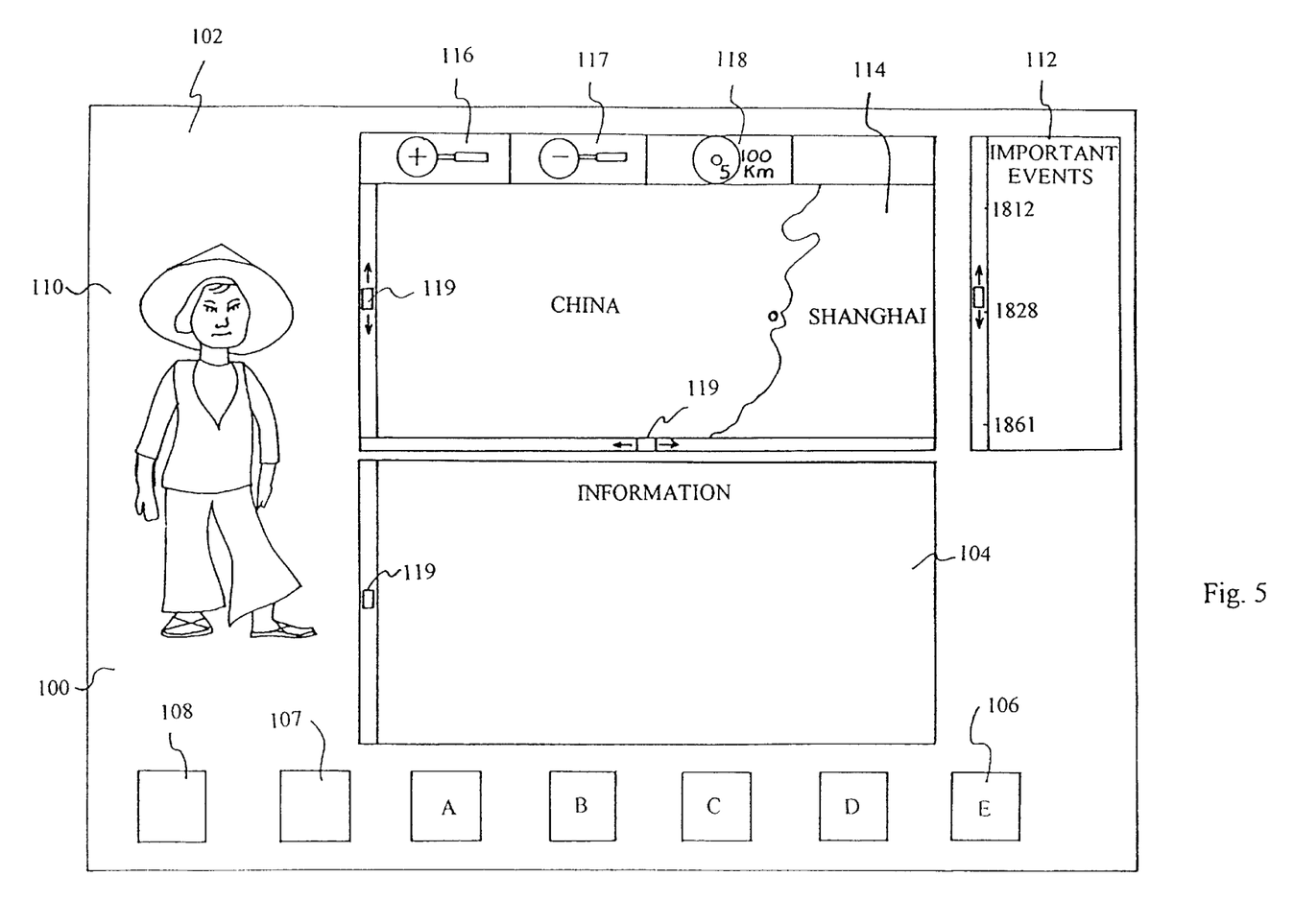
FIG. 5 is a view of a game computer display.

A second embodiment of the invention is shown in FIG. 5 based on a computer display 110 shown in FIG. 5. This embodiment preferably uses character pools which are not necessarily exactly representative of the entire population of humans which have been born. Instead the data is grouped to form grouped data, wherein the grouping may be by time or otherwise. Time periods 112 are preferably defined as shown in FIG. 4a and 4b to form time period character data pools. This may be done by sorting the data in the character identity data base to define plural data pools. The time periods may be selected so that they generally are based on a population pool having a similar number of people. However, according to the embodiment of FIG. 5, the time periods which define each character pool are primarily defined to provide a player with the opportunity to have character provided for several historic (or forecasted future) time periods. Twenty time periods 120–160 (see FIG. 4b) are chosen such as: pre-history; 5,000–1,000 B.C.; 1,000 B.C.–500 B.C.; 500 B.C.–0; 0–250 AD; 250 AD–500 AD; 500 AD–750 AD; 750 AD–1000 AD; 1000 AD–1250 AD; 1250 AD–1500 AD; 1500 AD–1600 AD; 1600 AD–1700 AD; 1700 AD–1750 AD; 1750 AD–1800 AD; 1800 AD–1850 AD; 1850 AD–1900 AD; 1900 AD–1950 AD; 1950 AD–2000 AD; and "future". These time periods do not present population pools of equal number of individuals based on historical data. Instead, the time periods are set out based on the concept of the player being provided with at least one character from each time period and thereby being provided with an opportunity to appreciate history and geography.

Defined Character pools

The number of characters in each character identity data pool 120–160 does not have to be equal. Time periods which represent an actual time period with a larger number of humans populating the Earth, may be defined with more defined characters than time periods which correspond to actual time periods wherein the actual population of the Earth was lower. According to this example, the defined time period 158, namely 1950AD to the year 2000 corresponds to an actual time period where a certain amount of people live. As the time period is shorter than the average life of an individual living between 1950 and 2000, the data pool is defined based on humans born between 1951 and 2000 AD If this actual pool is roughly 6 billion people, this would roughly represent 60% of all humans ever born. Time periods 120 through 157 can represent 40% of all character identities and time period 158 can represent 60% of all character identities based on historic data. Time period 160 can represent a forecast as to future births with the number of character identities being related to time period data pool 158 based on the forecast used (a future data pool is not required and is not discussed in the example which follows). If time period 20 is used, this can have a character pool with a number which is based on a forecast predicting human births.

If 1,200 character identities are defined for time period data pool 158 800 character identities are defined and distributed through time periods 120 through 157 (based on relative actual populations during those time periods). With this version of the game, the computer selects a character identity for the player, based on each of the N time periods (20 time periods 120 through 158 are proposed in FIG. 4a and 4b). After a player has reviewed all information for the character provided by the computer, for a character of a time period such as for first time period data pool 120 (or after the character dies), the player is provided with a second character identity, this time from a subsequent or some subsequent (or sequential) time period. The user may be provided with a character from each of the 20 time periods. After each identity has been considered, either after all information has been presented or after the user progresses through events of the character's life, to death, a character from the next time period is provided. If data is provided which is roughly equal to actual numbers, a player who plays the game repetitively, is more likely to receive the same character as a previous game, in the time periods 1 through 3 as opposed to the time periods 18, 19 and 20. However, by having the data stored wherein the number of character identities is based on actual human population information, it is possible to also proceed through the game wherein the first character generated is randomly chosen from a first defined number of character identities in the combined character identity pools 120–158 (or 160). Thereafter the player receives a character identity which is the next character based on the defined number of character identities after the last character identity chosen. If all character identity data is sequentially listed, for example based on 2000 stored characters, the player could be provided with every 100th character. This approach provides the possibility of the player playing the game as if every Nth character is the previous character reincarnated. The two above examples relating to defined data pools 120–158 both provide the ability for the player to pass through time and to be presented with some historical context in that a human from pre-history or early times is usually provided as the first character. With the first version, there are fewer characters to be selected in providing a character to the user, in the early time periods. In the second example of defined data pools, a relationship to actual human population is provided however numerous characters are generated in the later time periods, 18, 19 and 20 based on the fact that the greatest number of humans were born in those time periods. These examples allow for the fact that more information is available in recent times than in early times thereby allowing the player to progress through history and be acquainted with geography and human culture and wherein the greatest selection of characters reflects the fact that much more information is available for the recent time periods (much more diversity). The second example provides the player with the possibility of to some extent experiencing history although experiencing recent history is much more likely based on the more numerous characters available. Both examples provide the user with geographic data as characters will be defined, distributed over the entire planet.

Expandable Character Pools

According to a preferred form of the invention, character identities are defined for each of the time period data pools 120–160. More specifically, the character identities are grouped by date (sort of data base)The preferred embodiment for use with the computer/CD version of the game provides characters successively over 20 time periods as shown in FIG. 4b. The 20 time periods are generally the same as the 20 time periods as the examples for the defined character pools. However, the number of character identities in each of the data pools for each of the time periods 101–120 does not have to be equal or have any relation to the other pools, if there is random selection only within a pool. Only the characters 105 of each pool need to be related based on population and geographic region.

Figure 8A:
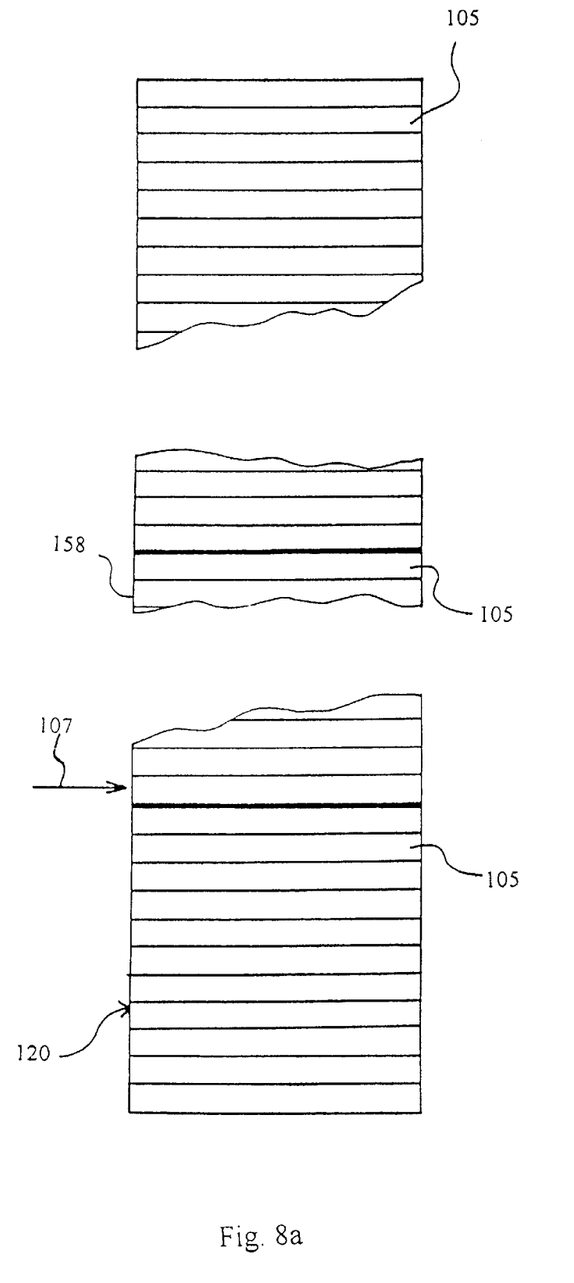
FIG. 8a is a diagram illustrating selection by the hardware/software selection means.
Figure 8B:
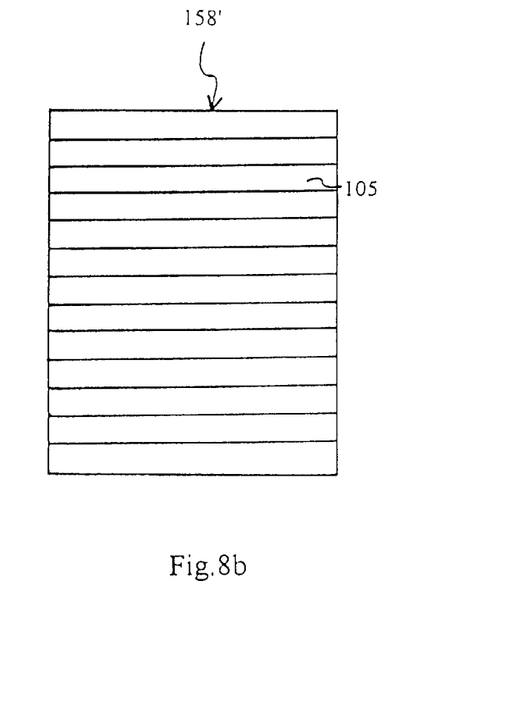
FIG. 8b is a diagram illustrating addition of data.

For example, according to this preferred form of the invention, the time period data pool 158 (see FIG. 8a) could have 500 character identities 105 and the first time period 120 could have 50. Later, the user could purchase additional data pools (see FIG. 8b) for the various time periods for example the user could purchase 1,000 character identities 158' for time period 158 and 50 more character identities for time period 1. However, within each package or each data pool within a time period, the character identity should have a geographical location which is distributed in the data pool in approximately the same way or in substantially the same way as the actual (estimated historical) distribution of population for the time period.

The data may be sorted in various ways including the time period data pools. Random selection 107 within a group or a sub group (based on two sort criteria) is possible following a software/hardware routine.

Computer/CD ROM

Figure 6:
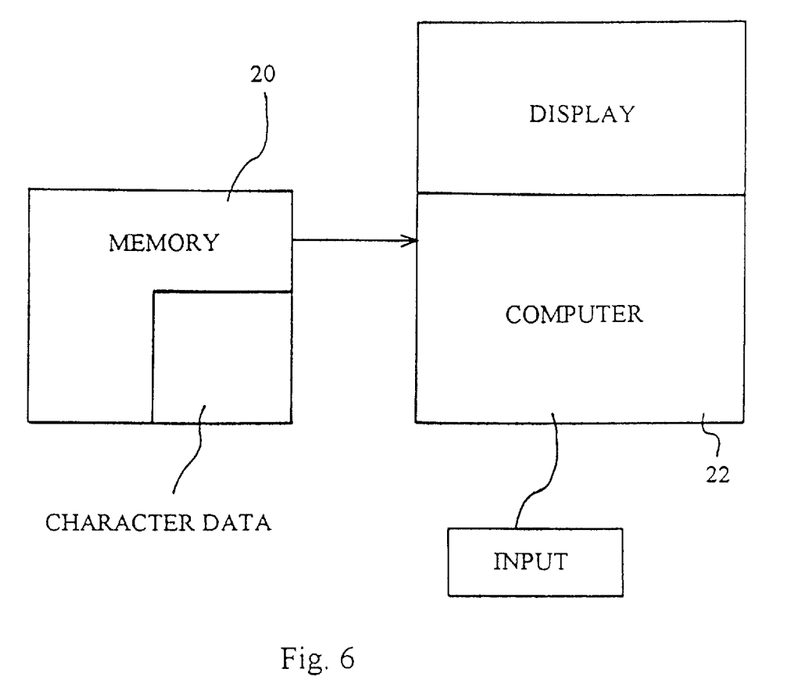
FIG. 6 is a schematic view showing a configuration for playing the game with computer and CD ROM.

Data is stored for each time period data pool 120–160 via use of a compact disk read-only memory 20 or other convenient memory storage (on line access to data pools is also contemplated) as shown in FIG. 6. Memory 20 is connected to a computer 22. The memory 20 may be provided with as many character identities for a given time period data pool 120–160 as is desired.

The computer includes selection means 107 based on software, for selecting characters for a player. The selection may be a character from each date pool 120–160. The selection may also be by the player requesting a character from a specific time period or from a geographic location or region.

Although various possibilities are available for initial and successive character selection, The game selection means preferably randomly selects a character from a time period data pool 120–160 and subsequent characters provided are preferably selected randomly from the next or some other data pool 120–160.

The player initiates the random selection of a character from the character data pools. Input via mouse or keyboard triggers software/hardware to select data stored memory 20. The computer is then provided with the information and the computer preferably interacts with software such as software which provides a display 100 as shown in FIG. 5.

The display 100 includes a location display portion 114, the location of the character with respect to the planet earth. Here again, the detail with regard to the display may be as complicated as desired. It may be as simple as showing the country or it may be more elaborate such as city plans, building detail and even interiors of buildings. This is preferably presented on the form of different levels of detail with successive detail levels being displayed by using the zoom in soft key 116 and zoom out soft key 117. The scale of the map, showing distances between locations can be activated by soft key 118. the location on the display can be moved with soft key symbols 119. The date is displayed at 112 and the appearance of the character is displayed at 110.

Other information can be read from display portion 104. This could include the entire history of the character (defined character discussed below) or it could describe the status of the character (interactive character discussed below). Information could include statistical data, cultural information, political information (including war/peace) environmental information, etc. The display may be successive graphic displays and may be continuous audio/video.

Other soft keys preferably include continue symbol 108, for moving to the next appropriate state, view symbol 107 for changing the view displayed and soft key symbols 106 for choosing from various alternate courses of action.

Predefined Character Lives

With the simple embodiment of the invention, each character from the various data pools 120–160 is predefined as to the characters life. In the board and card version discussed above, each card 10 includes the information 15 as to the entire life of the character.

According to a simple embodiment of the invention, the full life of each character is presented initially, when the player first perceives the character information. According to the board game version, when the player selects a card from the time period card stack 10, the player is presented with information as noted above but also information as to what occurred during the characters life and even the time and or nature of the characters death.

In a CD Rom format, data is provided relating to the life of the character and death of the character. In the simplest form of the game, this information is presented all at once initially to the player, whereby the player receives all information as to the character. The characters story over time such as the travels and movement of the character as well as other aspects of the character's life can be observed. In the CD Rom format, a story can be provided as to the characters life wherein movements can be followed on different selectable or predefined displays such as a map. Different graphical images may be presented. The life of the character is followed by the player including the characters interaction with history and interaction with the planet earth.

The player is presented with the character and the various display screens provide information about the character through death. The character identity information can include the appearance of the character at different points over the life (the character could be shown to age) wherein the appearance changes (the character grows and then ages). Clothing can provide cultural information about the character. The display 104 can tell the story of the character or display relevant information as audio/video data tells the story. The display 114 can show geographic information as the life story is told or displayed. The story may be printed in a continuous format (preferably audio/video data) or the player can have the character progress through time by clicking the continue symbol 108 to be presented with new graphics or new audio/video.

This embodiment further provides the opportunity to fill data character pools 120–158 with famous characters in history or noteworthy characters distributed geographically. This provides the player with less of the feel for the actual probabilities/possibilities of being born a particular person but more of an opportunity to travel through time and place and experience important events or people in history.

Interaction for Determining Character Lives

Figure 7A:
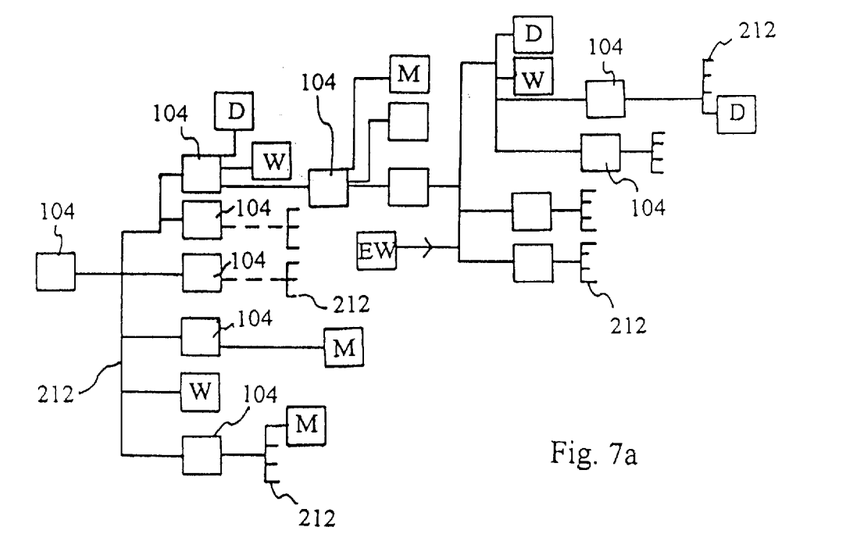
FIG. 7a is a diagram of a data event tree.

According to a more complicated version of the invention, means are provided for generating presenting an event in the characters life. The event may be provided somehow coordinated with actual history but may also be normal event allowing development of a character by a player of the game. The interaction (event) means is software based. As shown in FIG. 7a, the event means is based on an event tree 210 for each character. The event tree allows the player to interact by selecting a choice from various option paths 212. The options and event may be displayed in display portion 104 wherein an option may be selected through soft keys 106. As can be appreciated from FIG. 7a, the player is presented with one of successive displays 104 ( the other display portions may change or stay the same )including, at some point a display 104 which includes various options. The display here may be continuous from start until end (wherein another option must be selected). The player selects from the options and the choice leads to further displays 104, until the displays indicate the character has died (D).

Figure 7B:
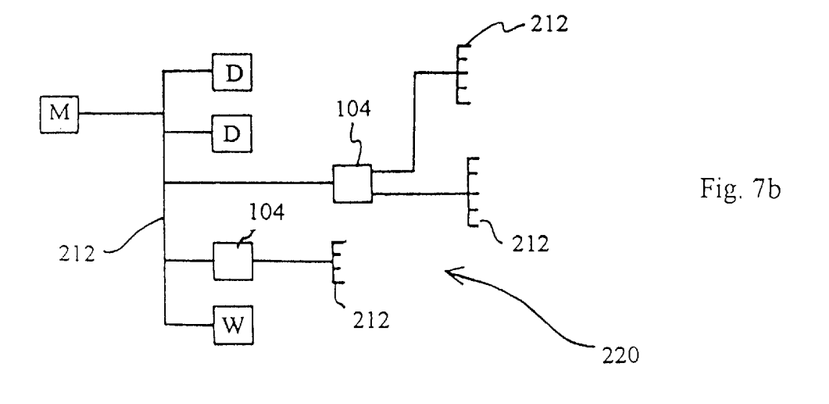
FIG. 7b is a diagram of another data event tree.
Figure 7C:
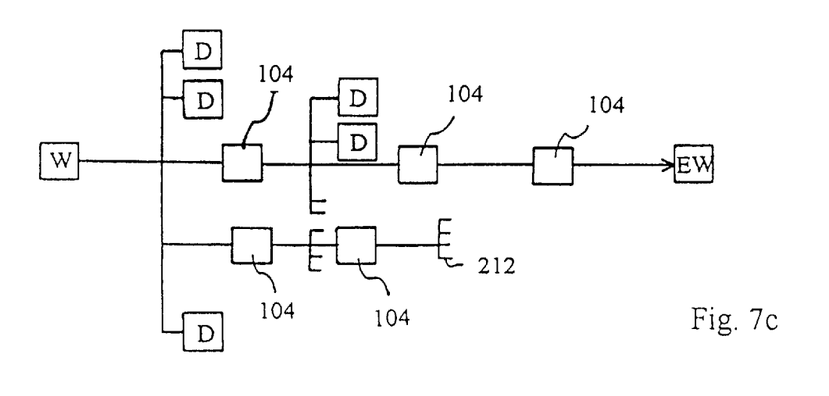
FIG. 7c is a diagram of another data event tree.

As shown in FIG. 7b and 7c, other event trees may be provided, which are used for more than one character. Such a common event tree could be an event tree used commonly for a time period which involves war (W), changing locations (M) etc. These event trees could be an option always available such as changing the location of the character (FIG. 7b), such that each set of options at screen 104 includes it. Other common event trees may be accessed open a player selecting some option. The go to War event tree W shown in FIG. 7c, could be disposed at several option paths 210 of the character event tree 200. The move location tree M can be available as an option at several locations along the event tree 200. Death D is also shown at several different locations as the paths 212 of the event tree always ends with the characters death (D). The war tree may include an end war (EW) display which returns the player to a location along the character event tree 200.

The event trees allow the characters to be developed based on interaction with the software by the user. Events displayed at 104 are character based on the options presented to the player and based on the option selected. This provides various possibilities as to goals of the game, as discussed below.

Data in the form of predefined event trees 200, 220, 230 etc are most preferably associated with the time period and/or geographic location. However, the data my be data which is not strictly associated with a time period (for example the character is now pregnant).

The status has been described primarily with respect to general information display 104. The display may be computer audio/video data and may include several different displays The status means, providing data based on a selection may provide that all displays are changed, for reflecting the character's status, after the selection of an option. The appearance at 110 is preferably changed as well as the location information at 114 and the date at 112. In the CD Rom version of the game, the status information may be by display of a variety of things including data as to the characters location, financial status, help status etc.. The display may be by graphical display (and/or audio/video data) or by a display in connection with other displays provided for that time period.

Goals and Manners of Play

As discussed above with regard to the board game version based on a single data pool, the goal can include getting the oldest character or getting a character for each geographic region. The embodiment of FIG. 3a can be used to play a game wherein a card is dealt to each player to define a round. The players read the information and match the location to locations of the map. After a predefined numbers of rounds, the players get points for each geographic region the player has cards for. Bonus points are rewarded for a player having a card corresponding to each geographic region. Other attributes can result in points such as oldest in time, youngest in time, farther north etc. The game can also be played wherein the rounds continue until someone has a character from each geographic region.

The Computer/CDROM version with predefined characters may be played with no specific goal, just for the fun of hearing or reading the story of the various characters. The selection may be by time period data pools 120–160 with selection being sequential or other selection as noted above including selection based only from one or more selected region. The characters selected may be subsequently noted in a table which may be saved to avoid getting the same character or for reviewing the geographic and historical data that was presented.

Figure 9:
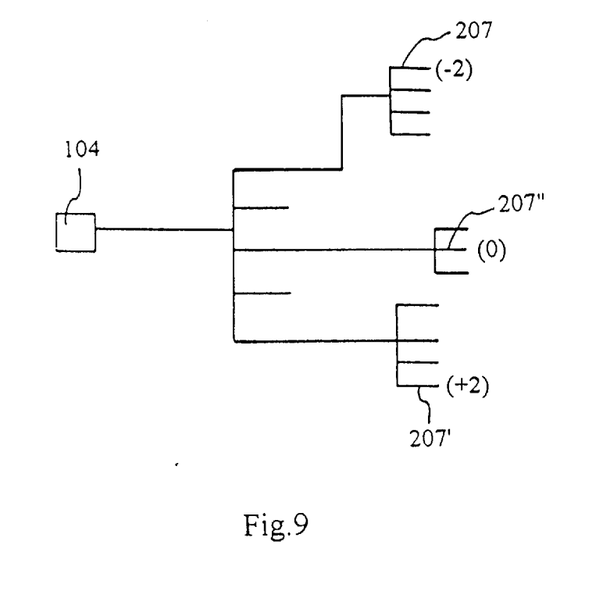
FIG. 9 is a diagram illustrating awarding points based on option paths taken.

The Computer/CDROM version wherein the player interacts to define the characters life, may also have no specific goal. However, the event trees may be structured to provide goals such as a monetary goal, a goodness goal, an evil goal, a contribution to humanity goal. The various options of the character event tree 200 may be grouped according to the goal. Depending on the choices (option paths 212 which the player takes) as to the options presented, each character played will receive points. A certain number of goodness points, for example, built up over several characters, could lead to the end of the game (the spirit goes to heaven). The game could end in a similar manner for a player acquiring a certain number of badness points (the spirit goes to hell or is reincarnated as an animal or insect). One version of the game provides two opposite goals such as goodness and evil and ends with upon accumulating points for hell or heaven. This includes defining a goodness value for each path of each characters event tree 212 as shown in FIG. 9. This preferably includes one or more very bad paths 207 (value negative 2) and one or more very good paths 207'(value positive 2) as well as intermediate paths (value positive or negative 1) as well as neutral paths 207". The player plays through successive time period data pools 120–160 and the game ends after collecting either positive 10 points or negative ten points. The player can continue back to data pool 120 if 10 points (positive or negative) has not been reached by data pool 160. This dual opposite goal game can also be played with across data pool random selection of characters (random selection from pools 120–160) or the characters can be selected from the time periods based on the population change over time to simulate the person being reincarnated every nth soul (more characters are generated from recent times).

Several goals may be present or the points for each of several categories may be displayed after the player has gone through each of the data pools 120–160. The player can also indicate a preference for a goal. This could also include a player actively putting something at risk such as earned points toward the goal, in order to gain further toward the goal. For example, money could be put at risk to attain higher money goals (money could be saved for college, etc.).

Examples of goals include goodness wherein the player directs a character over time toward goodness. The player could actively direct the character toward goodness while the status changes and the player takes actions to respond to event data presented by the event means, directing the character towards goodness. Besides good and evil contribution to human kind could be set against selfishness, for a dual opposite goal structure. As points are awarded over a plurality of characters, the player can try to attain some level of points associated with the final goal, such as goodness points for achieving heaven or evil points for achieving hell or a player could try to achieve the highest points possible by repeated play or points can be compared between two players as to who has the highest points in one or more categories.

Analogy to Historical Data

Besides the use of data based on real or estimated data or based on history, the data may also be based on fantasy characters/places/times. This provides a player to experience fantasy characters and places (as opposed to fictitious characters based on real data) The various formats and features discussed above can be used for such a game based on fantasy characters and fantasy places.

TEACHING SYSTEM

According to a further embodiment of the invention, a teaching system is provided which combines the use of a database of characters and other materials to provide teaching in geography and/or social studies.

The preferred form of the teaching system provides a database of characters for one or more historical birth years. Preferably only a few years of characters, characters born in only a few successive years, is provided. For example, a database of characters is provided wherein all of the characters are born in either 1990, 1991 or 1992. The database of characters is such that each character has a particular characteristics. One characteristic is the geographic location at birth and possibly other geographic information relating to the life of the character. The characters preferably also have a name which is for a male or a female character. The distribution of the male and female characters in the character database may be proportional to birth data for males and for females for the geographic location. Other fictitious but factually based bibliographic material may be provided associated with each character in the data base of characters. The character database is preferably structured such that a first pool of characters may be provided with a distribution of geographic location which is representative of actual births at geographic locations during the birth years of the character data pool. Subsequent data pools are provided which can be combined with the initial data pool without disturbing generally the relationship between geographic location at birth data of the character data pool and substantially accurate data regarding actual births for the time period. An actual birth date can be associated with each character in the character data pool. However, preferably, the characters are initially not associated with a particular date of birth with regard to data for a particularly character. Dates of birth may be randomly assigned or assigned based on some scheme to the various characters of the character data pool. Assigning birth dates to the characters is described further below.

Preferably the bibliographic material includes information as to the circumstances during the characters first several years. The number of years the character is alive preferably generally corresponds to the number of years the student or player has been alive. The bibliographic material may be gender based or may be gender neutral. Specifically, the character data pool may be such that names are not specifically associated with characters wherein the bibliographic material of the character is selected from one data pool, the characters name is selected from another or two other data pools (male and female) and the data of birth of the character is selected from a third data pool. Other data pools may be provided wherein characters are based on a composite of data from various data pools. A selection of male or female gender characteristics regarding a character may be provided by assigning these characteristics based on percentages for different geographic locations. Other alternatives include providing a data pool of names which are gender based. The names correspond to names given in various geographic locations. In this way, the basic pool of characters can initially and foremost be a combined database of male character names for a given geographic location and a database of female character names for a geographic location. Also, separate data pools can be provided wherein the creation of the character is based on an algorithm which selects from various geographic location data pools based on actual statistics regarding births for the geographic location. In this way, a data pool relating to Shanghai will be selected more than a data pool relating to a remote region such as a portion of Australia. The same chances of selecting characters from the geographic locations may be provided by providing a single pool of characters with male and female names based on geographic locations wherein more characters are provided for geographic regions with higher numbers of births for a given time period.

PROCEDURE FOR LEARNING AND PLAYING

According to the system of teaching in the present invention, characters with geographic location data and preferably a male or female name are provided in a database of characters. The database is either maintained at the site of use, such as a classroom or the database is accessed through a communication system (the database of characters may be located at a web cite on the INTERNET). A user such as a teacher is provided with a name and date of birth of a student in the class. This is entered into the computer. The computer matches the students birth date with one character which may be randomly selected from a preferably large database of characters. The database may be as described above, characters with geographic location data. The actual information given to the student preferably includes a male or female name (preferably the odds of getting male or female coincide with the odds of being male or female in the geographic location of the randomly selected character), a geographical location of birth and other bibliographic material which is basically fictitious but is generally based on factual data. Each student in the class preferably receives one character at a time. A student subsequently collects characters such as receiving a new character on a weekly basis. The characters (see for example FIG. 36) may be printed out to a printer such as a color printer attached to the computer or unit accessing the database. The student preferably keeps a notebook wherein each character can be subsequently added to the notebook, for example on a weekly basis. In this way, each student proceeds to collect numerous characters, each having a different identity, each with the birth date of the student and, most likely, several from various different parts of the world. With this system, obviously many characters will be from China and of other heavily populated portions of the world. In this way, the characters which the student receives are more likely to be from populated regions such as Shanghai and New York City as compared to remote portions of Alaska, Australia and North Dakota. Nevertheless, a discussion amongst the various students as to characters collected, can provide hours of fun and great amounts of information as to various places around the world.

Preferably peripheral items are provided according to the teaching system including graphical presentations.

An obvious teaching tool is shown in FIG. 3a wherein a basic map of the world is provided. Subsequent overlays may be provided including elevation overlays, population distribution overlays, country boundaries at different points of human history and most preferably at least one country boundary showing the boundaries at the time of birth of the character or the boundaries at present where the character most likely resides.

After each character is provided to a given student, the student preferably either reads the information about the character, hears information about the character which matches or similar to the written description on the character printout, matches the location of the character to a map and also preferably looks at a graphical image of what the character may look like. To identify the student, the printout may include a legend such as friend of John Smith, wherein John Smith is the student.

The assignment of gender to coincide with geographical data may or may not be used according to the teaching system of the invention. For example, gender may be provided such that roughly half of the database of characters are male and roughly half are female. However, more males or females may be provided on the geographical basis based on actual data. For example, there may be regions wherein most infants survive such that there are slightly more males than females. There may be other regions wherein there are more females due to higher male infant mortality rates. Further, there may be regions where there are many more males due to medical manipulation of the birth population (such as regions wherein many more males are born than females).

ARCADE/VIDEO GAME

According to a further embodiment of the invention, an arcade/video game is provided, such as a unit which preferably allows a customer to deposit a certain amount of money such as a coin or token or paper currency in the machine and play a game. The game according to the invention is to use the date of birth of the player but to assign a character identity for that date of birth which is based on geographical data. The geographical data is set to have a distribution which corresponds to births for the time period around the date of birth of the player.

PROCEDURE FOR PLAY

The procedure for play includes entering a date of birth of either the player or some other date of birth. The video/arcade device includes means for selecting from the database of characters wherein the character provided to the player has geographical location of birth or location during life data which corresponds to actual information for a time period specifically or generally corresponding to the date entered by the player.

While specific embodiments of the invention have been shown and described in detail to illustrate the application of the principles of the invention, it will be understood that the invention may be embodied otherwise without departing from such principles.

What is claimed is:

1. A game, comprising:
 a data base with geographic location information data including a plurality of geographic locations;
 a data selector for selecting geographic location information data from said data base based on the population distribution for the geographic locations and the birth rate of the geographic locations for a time period; and
 a presentation medium for presenting the data selected to the player of the game.

2. The game according to claim 1, further comprising: means for assigning the time period and a date of birth to the data selected.

3. A game according to claim 1, further comprising: an additional data selector selecting bibliographic information which is fictitious but based on actual data, from a bibliographic information data base.

4. The game according to claim 1, wherein said time period is the most recent time period for which actual data is available.

5. The game according to claim 1, wherein birth rate is estimated based on the most recent actual birth rate data.

6. The game according to claim 1, wherein time period is selected by the player.

7. The game according to claim 1, wherein said geographic location information data includes places throughout the world.

8. The game according to claim 1, wherein said geographic location information data includes places throughout one country.

9. The game according to claim 1, wherein said time period is the most recent time period is a future or present time and said data is based on the most recent time period for which actual data is available.

10. A game, comprising:
 a data base with geographic location information data including geographic locations;
 a data selector for selecting geographic location information data from said data base based on a distribution of births, for said locations, for a time period;
 a presentation medium for presenting the data selected to the player of the game.

11. The game according to claim 10, further comprising:
 means for assigning the time period and a date of birth to the data selected; and
 an additional data selector selecting bibliographic information which is fictitious but based on actual data, from a bibliographic information data base.

12. A game process, comprising the steps of:
 providing a data base of characters, each character having individual identity data;
 selecting characters randomly from the data base, said identity data including location of character at birth data, the distribution of the locations of said location of character at birth data in the data base of characters being substantially proportional to the distribution of locations of actual people born for a given time period; and
 presenting the data selected to the player of the game.

13. A game process according to claim 12, further comprising:
 assigning a date of birth to the character selected from the data base of characters.

14. A game process according to claim 12, further comprising:
 proving additional data with the selected character including bibliographic information which is fictitious but based on actual data.

15. The game process according to claim 14, wherein said data includes a name linked with a geographic location.

16. The game process according to claim 15, wherein said names are male and female names based on names used in said geographic location and a ratio of male names to female names is provided based on a rate of male births to female births for said geographic location.

* * * * *